UNITED STATES PATENT OFFICE.

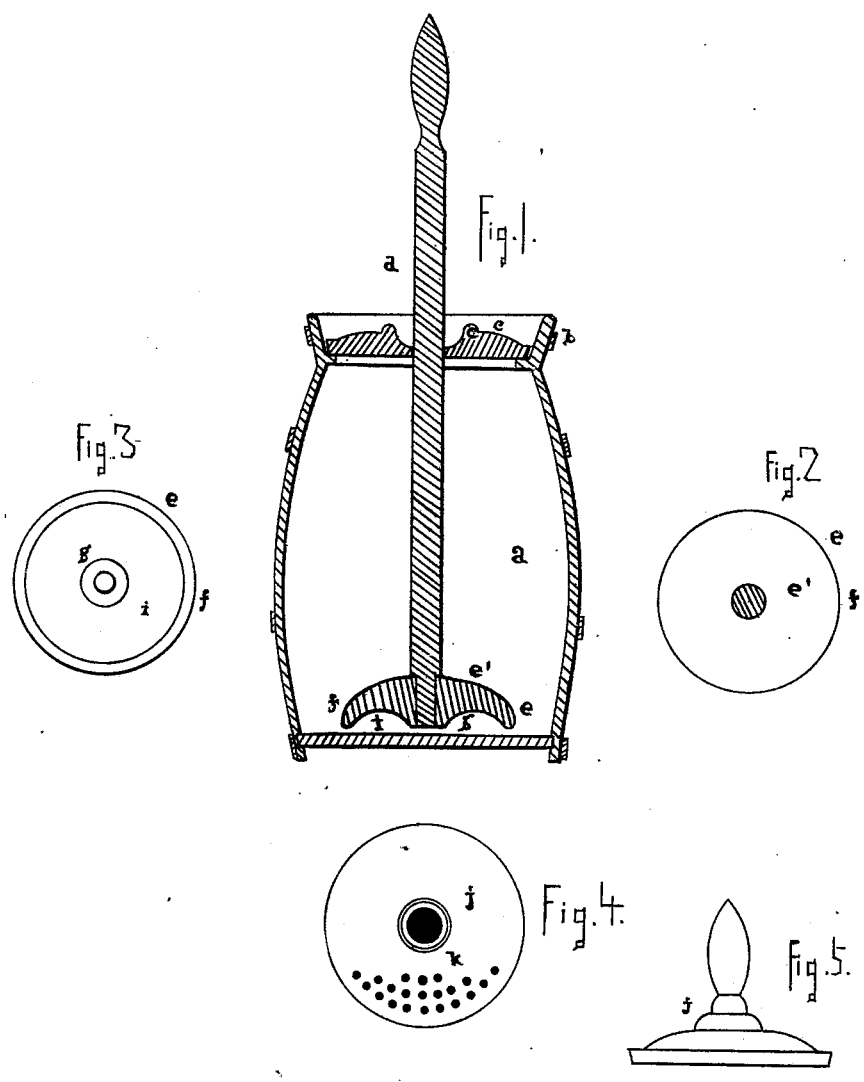

JOHN HIGGINS, OF BERKSHIRE, NEW YORK.

IMPROVEMENT IN PREPARING AND PACKING BUTTER.

Specification forming part of Letters Patent No. 213,568, dated March 25, 1879; application filed June 10, 1876.

*To all whom it may concern:*

Be it known that I, JOHN HIGGINS, of Berkshire, Tioga county, and State of New York, have invented a new and useful Method of Preparing and Packing Butter for Market, of which the following is a specification, reference being had to the accompanying drawings, which form a part thereof.

The object of my invention is to so prepare and pack butter for market that it will keep without spoiling for long periods of time, and without being kept in a cool place, either in transportation or upon arrival at its destination, and also to put it in a handy shape for sale, and, what is more important, to so prepare it that the user can with little trouble finish the preparation of the butter for the table to suit his own taste or the requisite of the particular market where it is to be sold.

The invention consists in the process and article hereinafter referred to in the claims.

Figure 1 is a vertical central section of a churn I use in carrying out my process. Fig. 2 is a top view of my dasher. Fig. 3 is a bottom view of my dasher. Fig. 4 is a top view of my strainer, and Fig. 5 is a side view thereof.

In the drawings, a is the churn; b, its cap; c, its cover; c', the dasher, convex on the upper side, and having rounded edges, as at e, and has a concave annular ring, i, in its lower side or face, and the dasher has a shaft, d.

When incipient granulation has commenced by the cream being churned in this or any other churn, I take out my dasher and remove the cover, and place instead of the cover the tightly-fitting strainer j, having perforations or a sieve, k, in its face, as shown in Fig. 4. I then draw off the buttermilk. I then proceed to wash the butter freely with water or brine in large quantities, using the strainer j to separate the granules from the water or brine, which carries away the caseine, sugar of milk, lactic acid, and other perishable matter orginally associated with it. All working of the butter is undesirable. It tends to break the granules and injures the flavor, and destroys its keeping qualities the same as it would to break an egg. I next place it in air-tight cans or packages, in which there is placed brine, or the brine may be dispensed with if desired.

I do not work the butter, for it would break the granules and allow the flavoring-oil to escape and destroy the flavor; but a little salt could be mixed in or not, as might be preferred by the user, but it is not really necessary that it should be for preservation or for use; but the consumers are not generally taught or accustomed to using it without salt, which is really its better state. I put the butter in this state in air-tight cans or receptacles containing a brine, so that the butter will be held in a solution, in which case I find that it will keep for years, and even where it is quite warm, without spoiling; and in its removal from its package or can it will not be necessary to work it, for it will contain no buttermilk. It can then be salted to suit the taste of the party or market purchasing it, and worked much or little to suit the taste; but the less the better. I may put it in cans without the brine when desired, and in some cases this might serve the purpose, especially where it was to be used soon, or where it was to be transported but a short distance.

If my butter so prepared and packed in cans is placed in a cool place, or in cold water, or upon ice, it will keep better, of course.

What I claim is—

1. The method herein described of preparing and packing butter, consisting in the following steps, viz: churning the cream, or cream and milk, until granules of butter are developed, or until incipient granulation only has commenced, separating this granulated butter from buttermilk, then thoroughly washing it, and finally, without working it or breaking the granules in any way or manner, placing it in air-tight cans or packages in a brine, as set forth.

2. The method herein described of preparing butter for market, consisting in churning cream, or milk and cream, until it commences to granulate or form into butter, then separating it from the buttermilk and thoroughly washing it without working it, and placing it in air-tight cans or packages.

3. As an article of commerce, butter in a granulated condition, prepared as described, and without having been worked, packed in an air-tight can or package in a brine, substantially as described.

JOHN HIGGINS.

Witnesses:
    SAMUEL J. PARKER,
    WM. J. TOTTEN.